United States Patent [19]

Franke

[11] Patent Number: 5,746,243
[45] Date of Patent: May 5, 1998

[54] VALVED INFLATION ADAPTER

[76] Inventor: Robert E. Franke, #6 St. Pius, Florissant, Mo. 63033

[21] Appl. No.: 607,993

[22] Filed: Mar. 4, 1996

[51] Int. Cl.⁶ ................................................. F16K 15/20
[52] U.S. Cl. ........................................ 137/231; 137/223
[58] Field of Search .............................. 137/223, 231

[56] References Cited

U.S. PATENT DOCUMENTS

| | | | |
|---|---|---|---|
| 2,969,082 | 1/1961 | Boyer et al. | 137/231 |
| 3,368,302 | 2/1968 | Martino | 137/223 X |
| 3,933,171 | 1/1976 | Dwyer et al. | 137/223 X |
| 4,043,356 | 8/1977 | Morris et al. | 137/223 X |
| 4,114,230 | 9/1978 | MacFarland | 137/223 X |
| 4,405,158 | 9/1983 | Huberman | 137/223 X |
| 4,795,426 | 1/1989 | Jones | 137/223 X |
| 5,305,784 | 4/1994 | Carter | 137/223 X |

*Primary Examiner*—John Rivell

[57] ABSTRACT

A valved inflation adapter for facilitating inflation of pneumatic objects. The inventive device includes an adapter body having a one-way valve assembly projecting therefrom which can be coupled to a conventionally known air chuck of a pressurized air source. The adapter body can be coupled with an inflation needle or an inflation cone to facilitate inflation of various pneumatic objects while precluding deflation of the object when the air chuck is not engaged with the valve assembly.

1 Claim, 3 Drawing Sheets

VALVED INFLATION ADAPTER

BACKGROUND OF THE INVENTION

1. Field of the Invention

The present invention relates to pneumatic coupling devices and more particularly pertains to a valved inflation adapter for facilitating inflation of pneumatic objects.

2. Description of the Prior Art

The use of pneumatic coupling devices is known in the prior art. More specifically, pneumatic coupling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art pneumatic coupling devices include U.S. Pat. No. 5,358,001; U.S. Pat. No. 3,905,387; U.S. Pat. No. 4,568,081;

U.S. Pat. No. 3,932,977; U.S. Pat. No. 5,148,712; U.S. Pat. No. 4,714,098; and U.S. Design Pat. No. 304,817.

While these devices fulfill their respective, particular objectives and requirements, the aforementioned patents do not disclose a valved inflation adapter for facilitating inflation of pneumatic objects which includes an adapter body having a one-way valve assembly projecting therefrom which can be coupled to a conventionally known air chuck of a pressurized air source, wherein the adapter body can be coupled with an inflation needle or an inflation cone to facilitate inflation of various pneumatic objects while precluding deflation of the object when the air chuck is not engaged with the valve assembly.

In these respects, the valved inflation adapter according to the present invention substantially departs from the conventional concepts and designs of the prior art, and in so doing provides an apparatus primarily developed for the purpose of facilitating inflation of pneumatic objects.

SUMMARY OF THE INVENTION

In view of the foregoing disadvantages inherent in the known types of pneumatic coupling devices now present in the prior art, the present invention provides a new valved inflation adapter construction wherein the same can be utilized for facilitating inflation of pneumatic objects. As such, the general purpose of the present invention, which will be described subsequently in greater detail, is to provide a new valved inflation adapter apparatus and method which has many of the advantages of the pneumatic coupling devices mentioned heretofore and many novel features that result in a valved inflation adapter which is not anticipated, rendered obvious, suggested, or even implied by any of the prior art pneumatic coupling devices, either alone or in any combination thereof.

To attain this, the present invention generally comprises a valved inflation adapter for facilitating inflation of pneumatic objects. The inventive device includes an adapter body having a one-way valve assembly projecting therefrom which can be coupled to a conventionally known air chuck of a pressurized air source. The adapter body can be coupled with an inflation needle or an inflation cone to facilitate inflation of various pneumatic objects while precluding deflation of the object when the air chuck is not engaged with the valve assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valved inflation adapter apparatus and method which has many of the advantages of the pneumatic coupling devices mentioned heretofore and many novel features that result in a valved inflation adapter which is not anticipated, rendered obvious, suggested, or even implied by any of the prior art tool guides, either alone or in any combination thereof.

It is another object of the present invention to provide a new valved inflation adapter which may be easily and efficiently manufactured and marketed.

It is a further object of the present invention to provide a new valved inflation adapter which is of a durable and reliable construction.

An even further object of the present invention is to provide a new valved inflation adapter which is susceptible of a low cost of manufacture with regard to both materials and labor, and which accordingly is then susceptible of low prices of sale to the consuming public, thereby making such valved inflation adapters economically available to the buying public.

Still yet another object of the present invention is to provide a new valved inflation adapter which provides in the apparatuses and methods of the prior art some of the advantages thereof, while simultaneously overcoming some of the disadvantages normally associated therewith.

Still another object of the present invention is to provide a new valved inflation adapter for facilitating inflation of pneumatic objects.

Yet another object of the present invention is to provide a new valved inflation adapter which includes an adapter body having a one-way valve assembly projecting therefrom which can be coupled to a conventionally known air chuck of a pressurized air source.

Even still another object of the present invention is to provide a new valved inflation adapter wherein the adapter body can be coupled with an inflation needle or an inflation cone to facilitate inflation of various pneumatic objects while precluding deflation of the object when the air chuck is not engaged with the valve assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
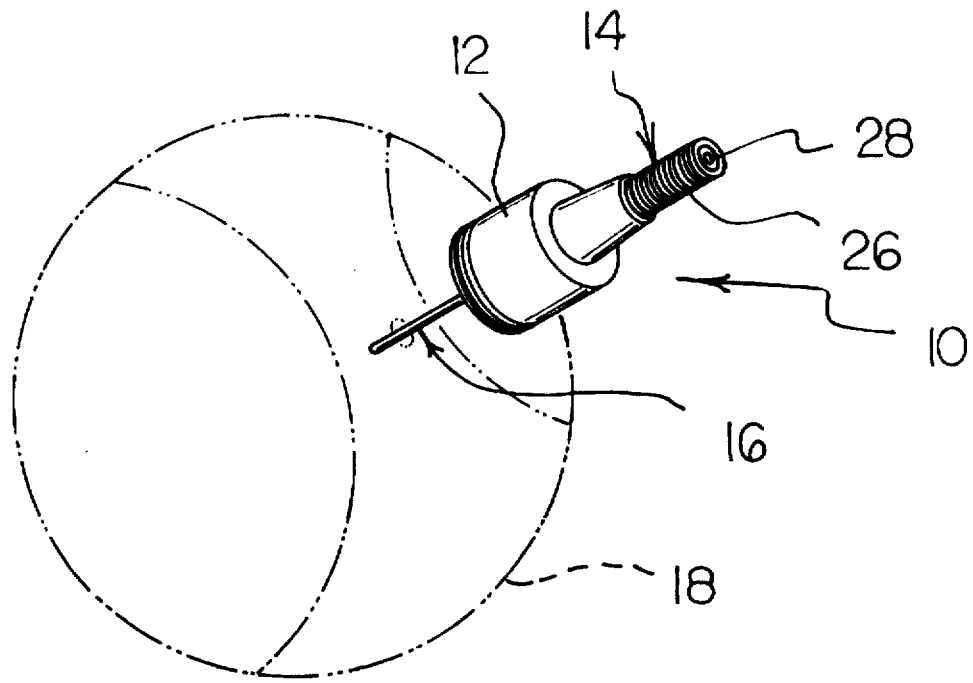
FIG. 1 is an isometric illustration of a valved inflation adapter according to the present invention in use.

With reference now to the drawings, and in particular to FIGS. 1–6 thereof, a new valved inflation adapter embodying the principles and concepts of the present invention and generally designated by the reference numeral 10 will be described.

More specifically, it will be noted that the valved inflation adapter 10 comprises an adapter body 12 having an outer exterior surface of sufficient diameter and circumference to permit for ease of gripping and manual manipulation of the invention 10 during use. A one-way valve assembly 14 extends into the adapter body and can be utilized for coupling with an unillustrated air chuck connected to a pressurized air source such as is commonly utilized to inflate pneumatic vehicle tires and the like. The adapter body 12 is shaped so as to be coupleable with an inflation needle 16, such as is shown in FIG. 1, to permit for inflation of various pneumatic objects 18. By this structure, the adapter body 12 can be coupled with the inflation needle 16 to facilitate inflation of a desired pneumatic object 18 while precluding deflation of the object when the air chuck is not engaged with the valve assembly 14 such as occurs during installation and/or removal of the inflation needle from the pneumatic object.

Figure 2:
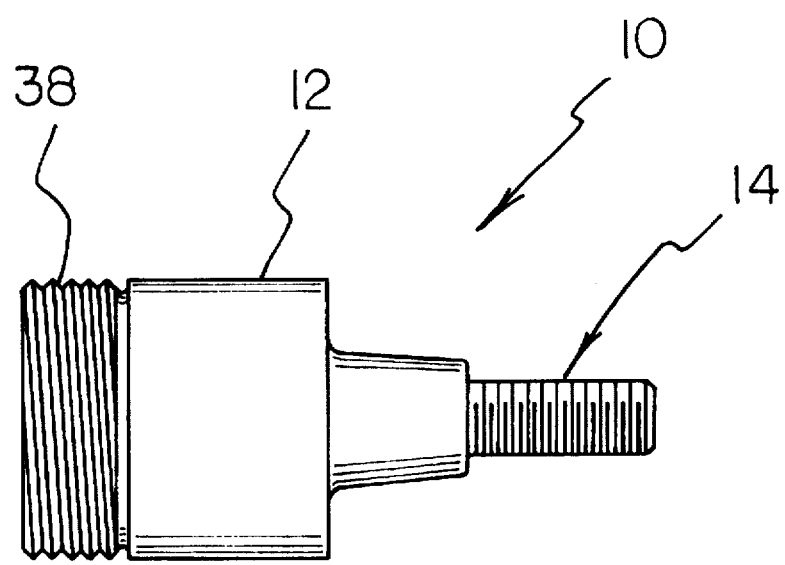
FIG. 2 is a front elevational view of the valved inflation adapter.
Figure 3:
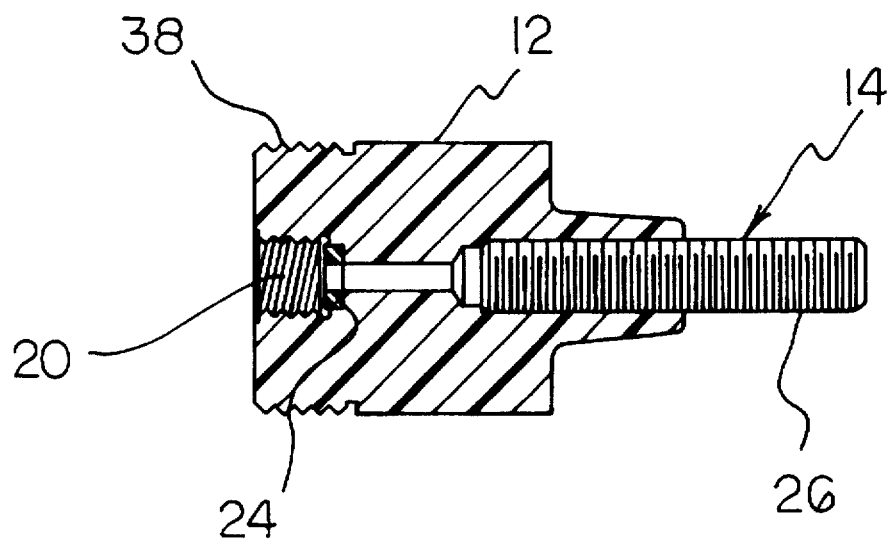
FIG. 3 is a cross sectional view of the invention.
Figure 4:
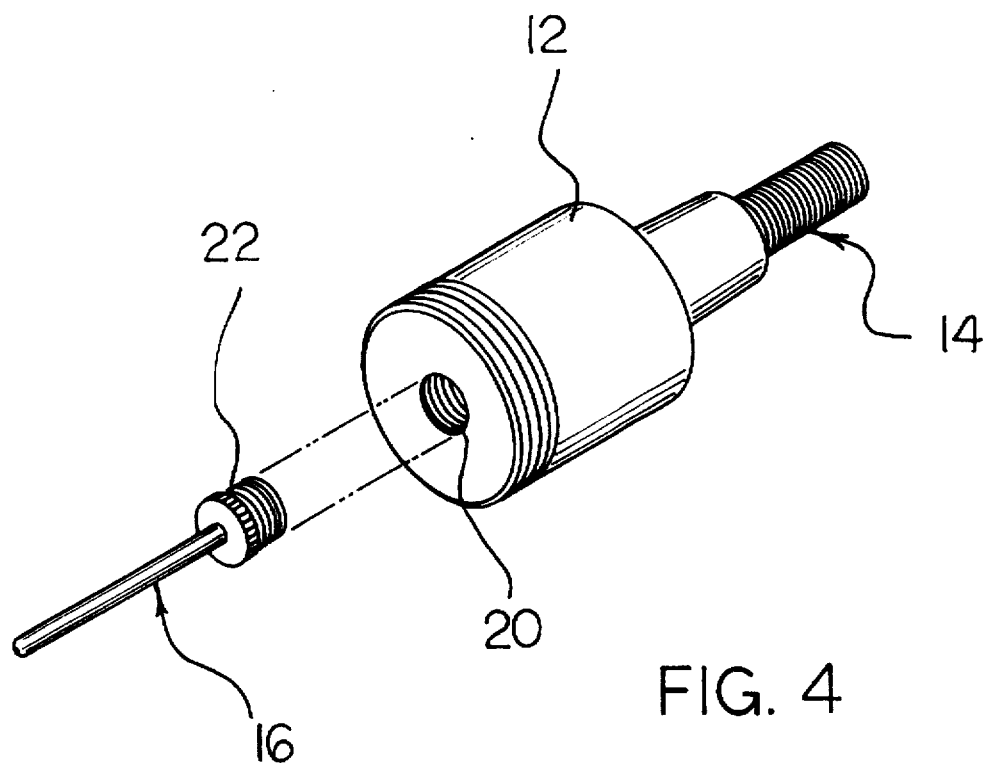
FIG. 4 is an isometric illustration of the invention detailing coupling thereof with an inflation needle.

Referring now to FIGS. 2 through 4 wherein the present invention is illustrated in detail, it can be shown that the adapter body 12 of the present invention 10 is preferably shaped so as to define a threaded bore 20 directed thereinto and into fluid or pneumatic communication with the valve assembly 14. The threaded bore 20 is shaped so as to receive and threadably engage with a threaded neck 22 of the inflation needle 16. To preclude leakage of pressurized air past a juncture of the inflation needle 16 and the adapter body 12, the present invention 10 further includes an internal annular seal 24 positioned within the threaded bore 20 and against an internal ridge formed within the adapter body 12. By this structure, the adapter body 12 can be coupled with the inflation needle 16 through a manual engagement of the threaded neck 22 thereof with the threaded bore 20 to permit for a pressurized injection of air through the inflation needle 16 and into a pneumatic object 18 such as is illustrated in FIG. 1 of the drawings.

With continuing reference to FIGS. 1 through 4, it can be shown that the valve assembly 14 of the present invention 10 preferably comprises a hollow threaded conduit 26 which is threadably directed into the adapter body 12 and into fluid communication with the threaded bore 20 thereof. A valve mechanism 28 (see FIG. 1) is threadably secured within the hollow threaded conduit 26 and operates to permit a one-way injection of air through the hollow threaded conduit 26 and into the adapter body 12. The valve mechanism 28 preferably comprises a conventionally known tire valve assembly or "schrader valve" which is threadably secured within the hollow threaded conduit 26 and operates to permit the one-way injection of air thereinto. By this structure, the valve assembly 14 can be coupled with a pneumatic air source such as an unillustrated air chuck connected a pressurized pneumatic conduit to permit for inflation of the pneumatic object, with the valve assembly 14 precluding an escape of air from the pneumatic object when the air chuck is de-coupled from the valve assembly 14 subsequent to use of the device 10.

Figure 5:
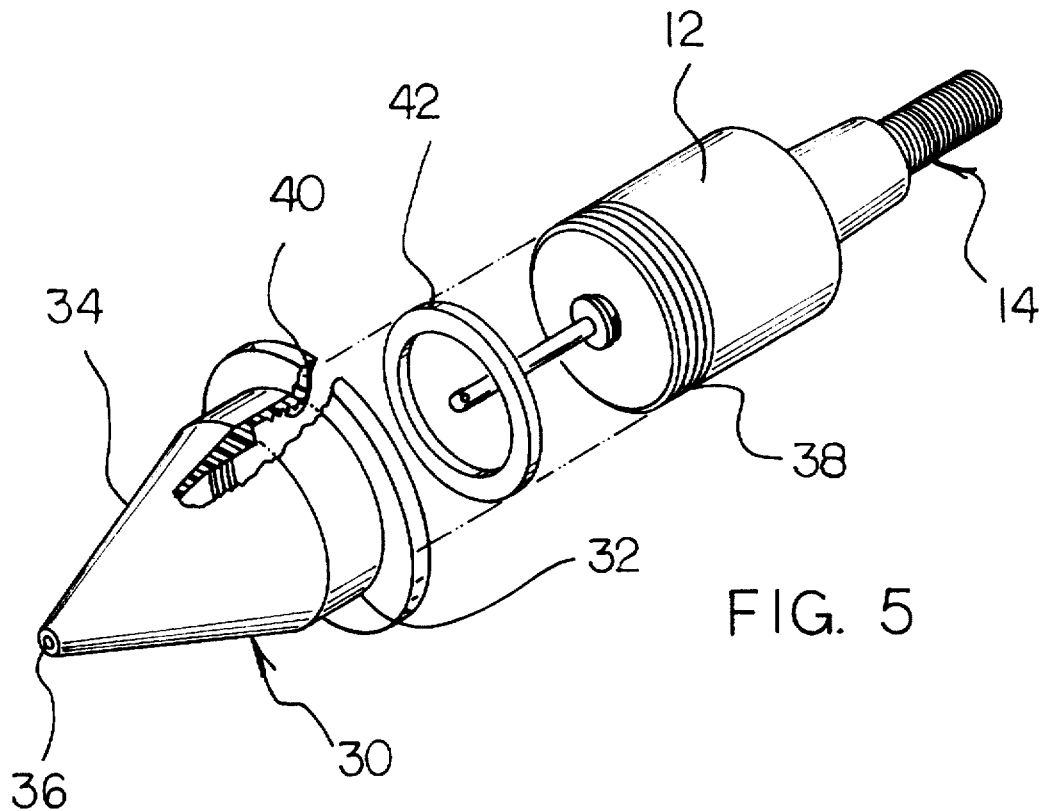
FIG. 5 is an isometric illustration of the invention detailing coupling thereof with an inflation cone.
Figure 6:
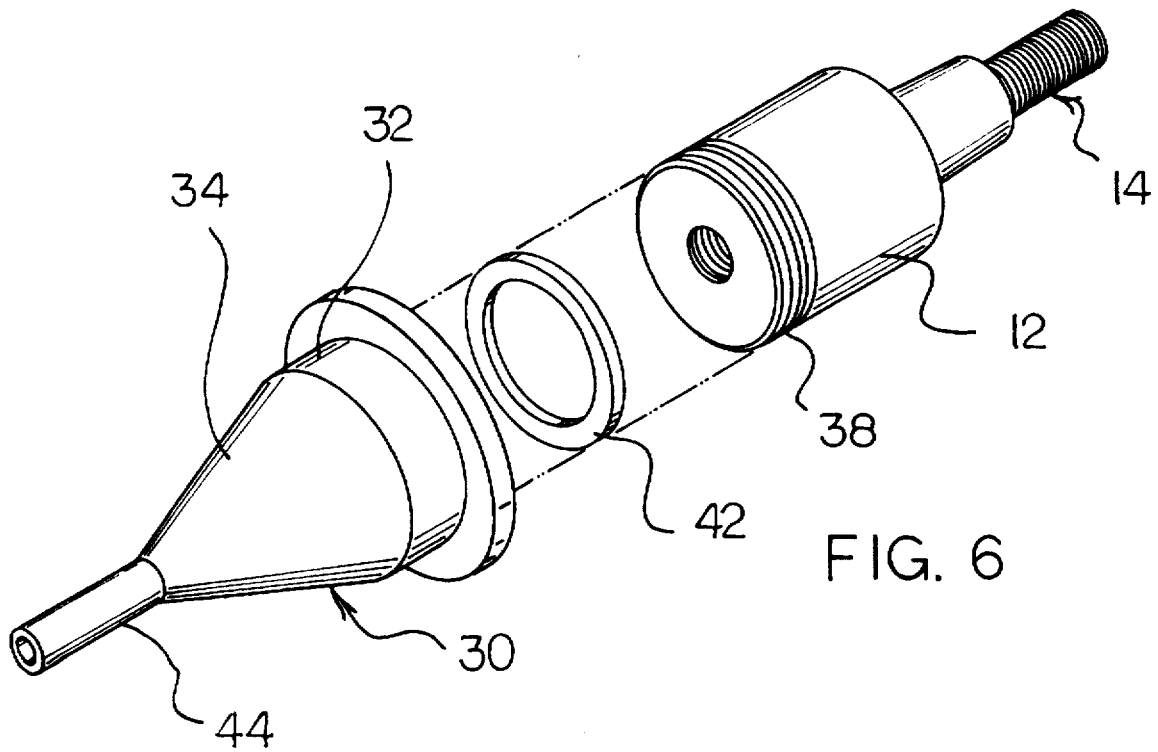
FIG. 6 is an isometric illustration of the invention including a valve-operating extension conduit projecting from the inflation cone.

Referring now to FIGS. 5 and 6, it can be shown that the present invention 10 may additionally comprise an inflation cone 30 securable to the adapter body 12 for permitting a pressurized injection of air into a pneumatic object having an odd or atypical type inflation neck, such as an inflatable raft or the like. The inflation cone 30 includes a cylindrical side wall 32 which can be engaged with the adapter body 12 so as to couple the inflation cone 30 thereto. A conical side wall 34 extends from the cylindrical side wall 32 and tapers to a diameter smaller than that of the cylindrical side wall 32 to terminate in an inflation aperture 36 permitting a direction of air therethrough. To couple the inflation cone 30 to the adapter body 12, the adapter body 12 may be shaped so as to define exterior threads 38 extending circumferentially thereabout which matingly engage with interior threads 40 formed along an interior surface of the cylindrical side wall 32. An external annular seal 42 can be interposed between the adapter body 12 and an internal ridge formed within the cylindrical side wall 32 to preclude leakage of pressurized air past a juncture of the inflation cone 30 and the adapter body 12. As shown in FIG. 6, the inflation cone 30 may further include a valve-operating extension conduit 44 projecting from the conical side wall 34 for entering an inflation conduit of a pneumatic object and engaging an inflation valve therewithin to maintain the inflation valve of the pneumatic object in an open position. By this structure, the inflation cone 30 can be easily secured to the adapter body 12 in place of the inflation needle 16 to permit for inflation of various objects having odd-shaped inflation conduits leading thereinto.

In use, the valved inflation adapter 10 according to the present invention can be easily utilized for facilitating inflation of pneumatic objects. To this end, the inflation needle 16 can be secured to the adapter body 12 to permit for inflation of pneumatic objects such as game balls of the like. The inflation cone 30 can alternatively be secured to the adapter body 12 to permit for inflation of pneumatic objects such as rafts or the like. If desired, the inflation cone 30 can be secured to the adapter body 12 over the inflation needle, as in FIG. 5, to provide for secure storage of the needle 16 during periods of non-use thereof, while still permitting use of the device 10 with the inflation cone 30 attached over the needle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A valved inflation adapter comprising:

an inflation needle having a threaded neck;

an adapter body, the inflation needle being coupled to the adapter body, the adapter body being shaped so as to define a threaded bore directed thereinto, the threaded bore receiving and threadably engaging the threaded neck of the inflation needle, the adapter body being further shaped so as to define exterior threads extending circumferentially thereabout;

a one-way valve assembly extending into the adapter body for coupling with an air chuck connected to a pressurized air source, the valve assembly being positioned in pneumatic communication with the inflation needle, the valve assembly comprising a hollow threaded conduit threadably directed into the adapter body and into pneumatic communication with the threaded bore thereof; and a valve mechanism threadably secured within the hollow threaded conduit for permitting a one-way injection of air through the hollow threaded conduit and into the adapter body;

an internal annular seal positioned within the threaded bore and against an internal ridge within the adapter body to preclude leakage of pressurized air past a juncture of the inflation needle and the adapter body;

an inflation cone secured to the adapter body, the inflation cone including a cylindrical side wall engaged with the adapter body so as to couple the inflation cone thereto; and a conical side wall extending from the cylindrical side wall and tapering to a diameter smaller than a diameter of the cylindrical side wall to terminate in an inflation aperture permitting a direction of air therethrough, the cylindrical side wall being shaped so as to define interior threads formed along an interior surface thereof, with the exterior threads of the adapter body being engaged with the interior threads of the cylindrical side wall;

an external annular seal interposed between the adapter body and an internal ridge formed within the cylindrical side wall to preclude leakage of pressurized air past a juncture of the inflation cone and the adapter body; and, a valve-operating extension conduit projecting from the conical side wall for entering an inflation conduit of a pneumatic object and engaging an inflation valve therewithin to maintain the inflation valve of the pneumatic object in an open position with the inflation needle therein.

* * * * *